US005565105A

United States Patent [19]

Thakor

[11] Patent Number: 5,565,105

[45] Date of Patent: Oct. 15, 1996

[54] MAGNETOCENTRIFUGATION

[75] Inventor: Nitish V. Thakor, Columbia, Md.

[73] Assignee: The Johns Hopkins University, Baltimore, Md.

[21] Appl. No.: 423,348

[22] Filed: Apr. 18, 1995

Related U.S. Application Data

[62] Division of Ser. No. 129,397, Sep. 30, 1993, abandoned.

[51] Int. Cl.[6] .................... B01D 35/06

[52] U.S. Cl. .................... 210/695; 435/173.9

[58] Field of Search .................... 210/223, 695, 210/787; 435/173.9, 261; 530/427; 935/19; 494/37, 85

[56] References Cited

U.S. PATENT DOCUMENTS

| | | | |
|---|---|---|---|
| 2,648,636 | 8/1953 | Ellis et al. | 210/695 |
| 3,534,902 | 10/1970 | Gilreath | 494/53 |
| 3,757,846 | 9/1973 | Herman | 164/499 |
| 4,190,524 | 2/1980 | Watson | 210/222 |
| 4,804,355 | 2/1989 | Brimhall et al. | 494/20 |
| 5,039,312 | 8/1991 | Hollis et al. | 55/3 |
| 5,173,262 | 12/1992 | Burtis et al. | 422/72 |

FOREIGN PATENT DOCUMENTS

| | | | |
|---|---|---|---|
| 3031673 | 4/1982 | Germany | 210/695 |

OTHER PUBLICATIONS

Roberto Rodriquez, Magnetocentrifugation, Masters of Science in Engineering Thesis—submitted to the Johns Hopkins University, Oct., 1992.

*Primary Examiner*—Matthew O. Savage
*Attorney, Agent, or Firm*—Cushman Darby & Cushman, LLP

[57] ABSTRACT

A device and method for performing particle separation. Separation and purification of biological macromolecules are important steps in basic molecular biology research and biotechnology product development. Throughout the years researchers have worked on developing different and better techniques. The present invention is directed to a new technique for separation of charged particles by applying a magnetic field parallel to the axis of rotation during centrifugation. Magnetocentrifugation performed according to the present invention thus enhances the separation of charged particles under centrifugation by adding a magnetically induced force, namely a Lorentz force, in addition to centrifugal, buoyant, and frictional forces. The technique of magnetocentrifugation may be utilized for separating particles with similar densities but different charges, and may be used for free as well as immobilized charged macromolecules such as proteins and DNA.

10 Claims, 3 Drawing Sheets

MAGNETOCENTRIFUGATION

This is a division of Application Ser. No. 08/129,397, filed Sep. 30, 1993, now abandoned.

BACKGROUND OF THE INVENTION

1. Field of the Invention

The present invention relates to particle separation, and, in particular, to a particle separation device referred to herein as a magnetocentrifuge and the use of the magnetocentrifuge to separate particles, such as proteins, DNA strands and other charged biological macromolecules.

2. Description of the Related Art

Centrifugal forces are commonly utilized for separating macromolecules on the basis of mass or density. Molecules to be separated are spun at high speeds in cuvettes whereby they encounter centrifugal forces of graded levels based on the speed of rotation, mass or density of the particles, and density of the medium. Ultracentrifuges capable of spinning at more than 100,000 rpm are universally utilized in biological and biotechnological laboratories.

Biological macromolecules are also invariably characterized by charge on them, and techniques such as electrophoresis take advantage of charge (as well as size) to separate various species. Novel applications based on the influence of magnetic and electric fields have been proposed before, for applications such as containment of charged particles. Recently, magnetic fields were shown to alter the mobility of particles under electrophoretic conditions. However, in view of very small electrophoretic mobilities, the changes were not significant.

The principle of Lorentz force is commonly used in particle accelerators as well as mass spectrometers. However, these instruments work on very small ionic species in vacuum, and have not been found suitable for studying large biological molecules such as proteins and DNA, and other methods such as electrophoresis or chromatography are preferred.

SUMMARY OF THE INVENTION

An object of the present invention is to utilize Lorentz forces, centrifugal forces, viscous drag, and buoyancy forces to produce separation of charged macromolecules or such as proteins and DNA.

An instrument designed to spin a rotor carrying macromolecules at high speeds between magnetic pole pieces allows Lorentz forces to effect separation on the basis of charge on macromolecules. A prototype instrument includes two principal parts, a high speed rotor mechanism for centrifugation, and a magnet system (dc or electromagnet) for applying fields in an orthogonal direction. The device can be adapted to include a cavity holder, pole pieces in the sample proximity, a pulsed magnetic field, electromagnet cooling, proportional velocity control, braking, and sample detection built into the magnetocentrifuge. The Lorentz forces produced by magnetocentrifugation will influence charged particles such as microspheres, DNA, and proteins.

The magnetocentrifuge according to the present invention is a device for separating particles based upon at least one of mass and charge, including a sample holder for holding at least one sample, a source of rotational energy for rotating the sample holder, and a source of a magnetic field, which generates the magnetic field such that the magnetic field is applied to the samples while the source of rotational energy rotates the sample holder. The magnetocentrifuge according to the present invention operates to separate particles based on at least one of mass and charge, and includes the following steps: the step of generating a centrifugal force; the step of applying the centrifugal force to the particles; the step of generating a Lorentz force; and the step of applying the Lorentz force to the particles during the step of applying the centrifugal force to the particles.

BRIEF DESCRIPTION OF THE DRAWINGS

Other objects, features, and characteristics of the present invention, as well as the methods of operation and functions of the related elements of the structure, and to the combination of parts and economies of manufacture, will become apparent upon consideration of the following description and the appended claims with reference to the accompanying drawings, all of which form a part of this specification. In the drawings, like reference numerals designate corresponding parts in the various figures, and:

DETAILED DESCRIPTION OF THE PRESENTLY PREFERRED EXEMPLARY EMBODIMENT

Figure 1:
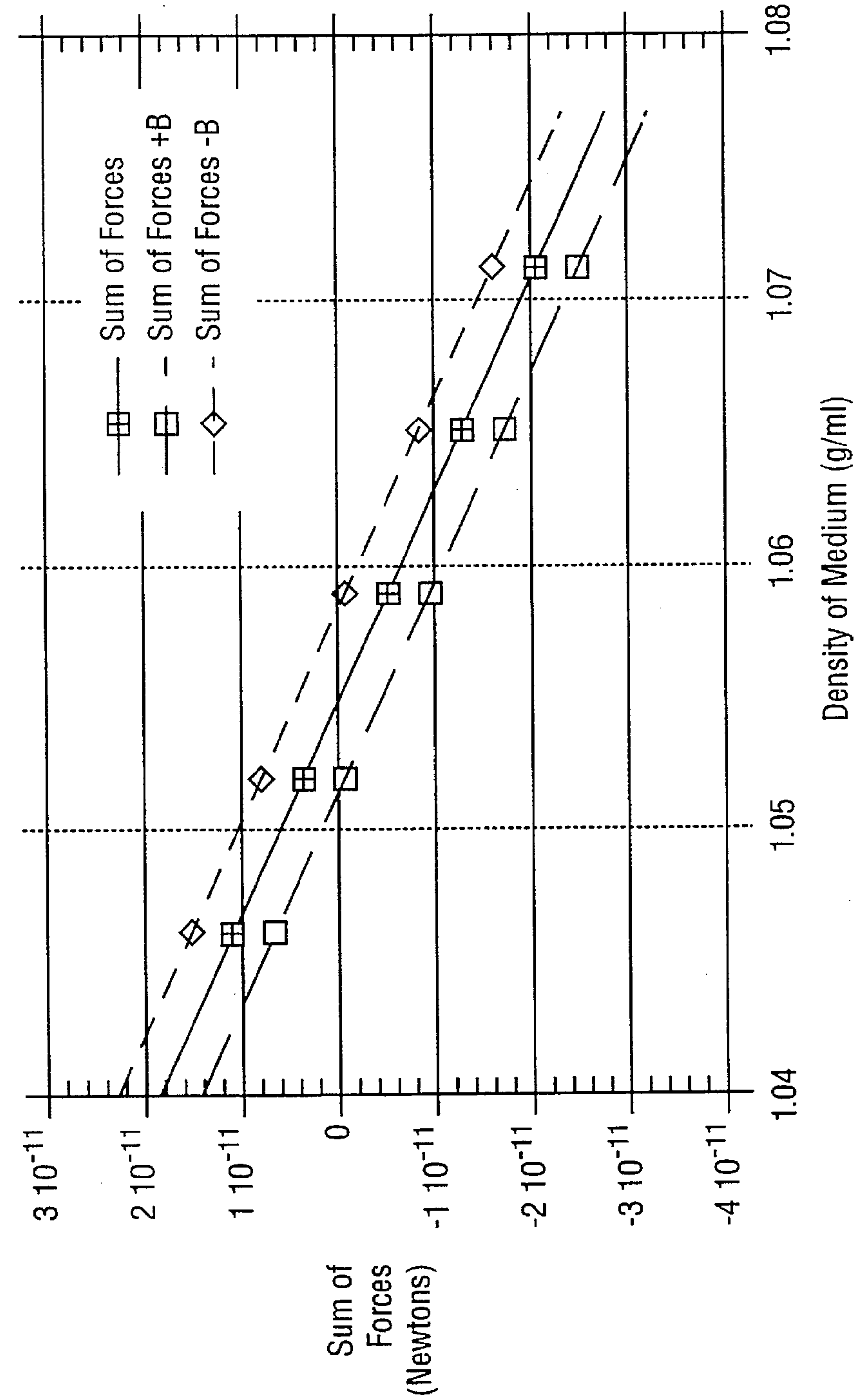
FIG. 1 shows a theoretical plot of the net forces acting on 0.833 μm diameter particles rotating at 5,000 rpm in a density gradient medium.

Magnetocentrifugation as disclosed herein is a novel way of separating macromolecules based on their properties of charge as well as mass. The particles are spun at high speeds, for example, as in a centrifuge and therefore are influenced by centrifugal forces proportional to their mass or density. The magnetocentrifuge of the invention also utilizes the Lorentz force given as $F=q\ V\times B$, where q is the charge on the macromolecule, V is the velocity at which the particle moves (a vector), and B is the magnetic field strength (also a vector). The Lorentz force is also proportionately higher when the applied magnetic field is orthogonal and its strength is high, as the magnitude of the cross product is equal to $qVB\sin\theta$ where $\theta$ is the angle between the velocity vector and the magnetic field vector. When the vectors are orthogonal to one another, $\theta$ is equal to 90° and $\sin\theta$ is 1. Any macromolecule with a charge q would experience a Lorentz force proportional to the speed at which it is moved and the field strength applied. The magnetocentrifuge works with DNA and proteins, and is a novel technique for purification, separation, and sequencing of biological macromolecules.

The magnetocentrifuge according to the present invention combines the benefits of other separation schemes, such as centrifugation and electrophoresis, that independently utilize two significant properties of the biological macromolecules: charge and mass. Thus, particle separation may be accomplished based on mass (or density) alone as with a conventional centrifuge. Additionally, a magnetic field can be applied in a direction such that Lorentz forces co-operate with centrifugal forces to speed up the separation process. If two species have comparable mass but different charge, then enhanced separation occurs due to the Lorentz forces. If two species have comparable charge and different mass, enhanced separation occurs by emphasizing centrifugal forces. If two DNA fragments can be separated in this manner, the sequencing of molecules is possible. Magnetocentrifugation does not suffer from the problem of joule heating as electrophoresis does. In many applications, such as purification of proteins or plasmids, separation by centrifugation and subsequent electrophoresis are two separate steps. The two steps can potentially be combined with magnetocentrifugation.

Rather than applying a force to a stationary molecule (one that is just sitting in a gel, such as in electrophoresis), the molecule is rotated in a centrifuge and a magnetic field is applied perpendicular to the plane of rotation during the process of magnetocentrifugation according to the present invention. Thus, two components of force are applied to the charged particle: a centrifugal force (proportional to the molecular mass) and a magnetic force (proportional to the charge). This principle allows the separation of same size, different charged molecules in less time than other methods and no molecule denaturizing (due to heating).

Samples subject to centrifugation consist of one or more classes of particles dispersed in a liquid medium. The particles are spun in a centrifuge rotor for a specified interval to effect the desired analysis. Under the influence of the centrifugal field, the particles will tend toward one of three actions: (1) they will sediment (move outward from the center of the rotor) if they are more dense than the surrounding fluid; (2) they will float (move toward the center) if they are less dense than the surrounding fluid; or (3) they will remain stationary with respect to the rotor if they are isopycnic with respect to the surrounding fluid. The speed of the particles depends on (1) the configuration and angular speed of the rotor, (2) the size, shape, and buoyant density of the particles, and (3) the physicochemical properties of the dispersing medium.

Lorentz force can naturally be balanced in the magnetocentrifuge by centrifugal forces (as in any conventional centrifuge) that depend on the rotational velocity, as well as mass or density of the particle and the medium. According to the present invention, charged macromolecules are spun at high speeds in high magnetic field strength environments. Accordingly, the particles experience a centrifugal force (dependent on mass/density) as well as a Lorentz force (dependent on charge). The total force F acting on the particles is defined by equation (1), where:

$$F=mv^2/r \pm qvB \qquad (1)$$

In this scalar equation, the first term gives the centrifugal force ($F_c$=(mass.acceleration) $=mv^2/r=mr\omega^2$, where r is the radius or distance from the center of rotation and $\omega$ is the angular velocity, and the second term, the Lorentz force (assuming here that the applied B field is perpendicular to the direction of rotation $F_L=zer\omega B$, where q=ze and e is the charge of an electron). Note that either the direction of rotation, or the direction of applied field can be altered to have the two forces be additive or subtractive. For a positive magnetic field the molecule will move toward the axis of rotation, and for a negative magnetic field, the molecule will move away from the axis of rotation.

Further analysis of the operation of the magnetocentrifuge includes a specific consideration of secondary forces. These arise from differences in the density of the sample and that of the medium, and viscous drag on the particle (viscosity is given by:

$$\eta=(\pi h g \rho_m (r_c)^4 t)/8LU$$

where h is the height of liquid pressure head, g is the gravitational constant, $\rho_m$ is the density of liquid, $r_c$ is the radius of the cuvette, t is the time of flow, L is the length of the tube, and U is the volume).

The particles are assumed to be spherical. Frictional force is thus calculated as:

$$F_f=6\pi\eta r(dx/dt)$$

where (dx/dt) is the translational or sedimentation velocity of the particle in the cuvette. Objects suspended in liquids also encounter buoyancy forces $$Fb=(m/\rho_p)\rho_m g$$

where $\rho_p$ is the density of the particle and $\rho_m$ is the density of the medium. Combining various equations, the net force on the particle is:

$$F_c+F_L=F_f+F_b \qquad (2)$$

FIG. 1 shows a theoretical plot of the net forces acting on 0.833 μm diameter particles rotating at 5,000 rpm in a density gradient medium. As the applied B field direction is changed, the Lorentz forces reverse resulting in increased or reduced net forces. Sedimentation velocity in a density gradient medium can be calculated as:

$$dx/dt=(\omega x/6\pi\eta r)\ (\rho V_p\omega \pm qB - V_p\rho_m\omega) \qquad (3)$$

where dx/dt is the sedimentation velocity, $\omega$ is the rotational velocity, $V_p$ is the volume of the particle, $\rho_p$ is the density of the particle, and $\rho_m$ is the density of the medium. As expected, the sedimentation velocity is increased or decreased by the applied B field.

The density of the medium may be uniform, or may form a gradient. Accordingly, equilibrium conditions change. It is possible to further develop equations that apply to magnetocentrifugation on particles in a density gradient to determine the equilibrium point in the absence and presence of Lorentz forces. Analogously, pH gradients can be developed for changing the effective charge on the molecule. Hence, equations can also be developed that will determine equilibrium point at various pH conditions.

Macromolecules to be considered in experiments would be expected to possess varying mass and charge. Therefore, field strengths and the rotational velocities will need to be optimized to suit the specific masses and charges under consideration. Equations (2), (3) will be simulated and so that any modifications may be made-to these to optimally select the instrument design parameters as well as the experimental conditions (V, B, etc.).

Figure 2:
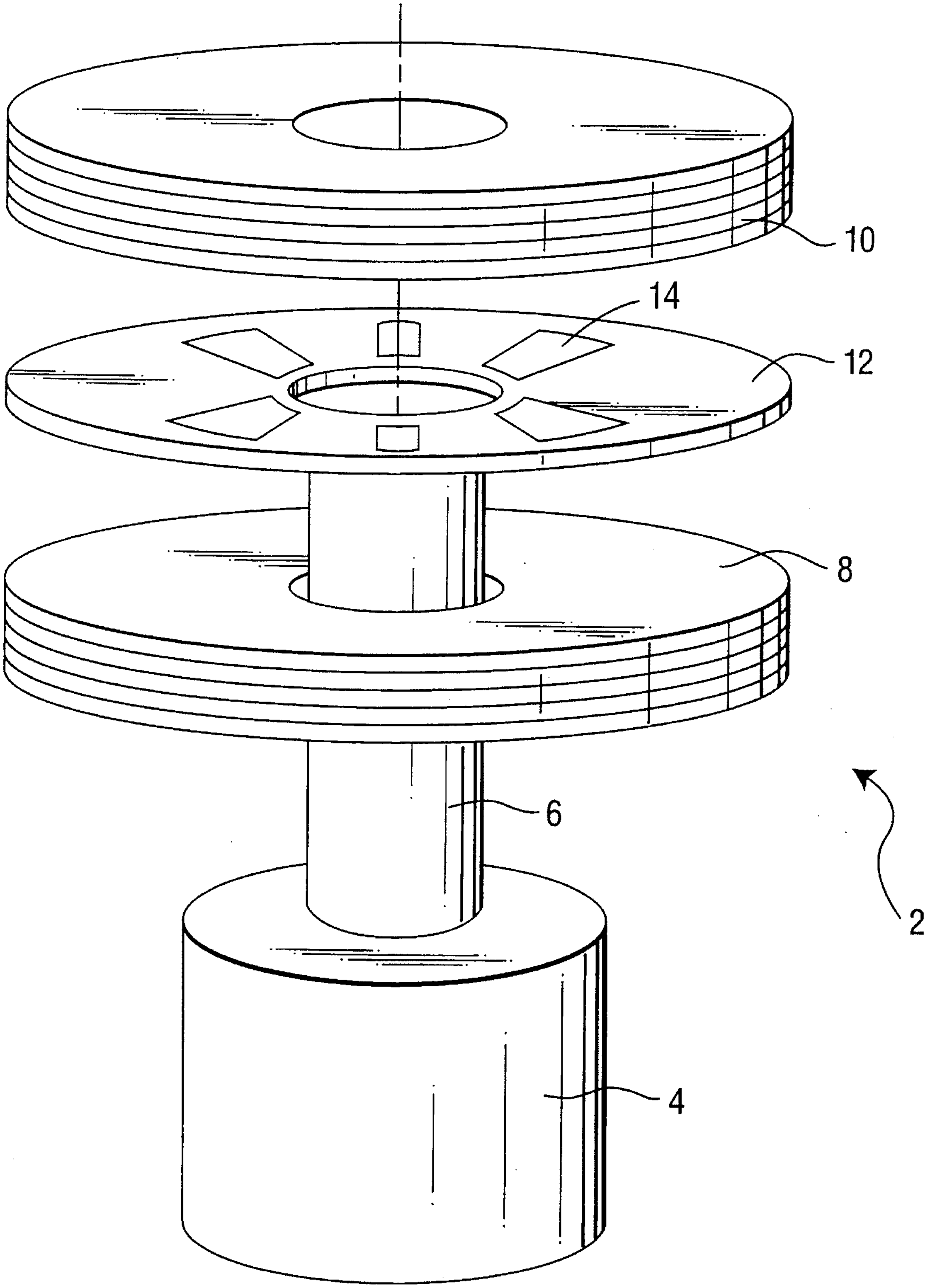
FIG. 2 is an illustration of the first embodiment of the present invention.

The first embodiment of the magnetocentrifuge comprises a centrifuge and a magnet system as shown in FIG. 2. Centrifuge 2 is custom designed from a high-speed electric motor driving a rotor holding the sample. Commercial centrifuges cannot be modified because there is no room for magnets and the applied magnetic field would interfere with the centrifuge's performance. Motor 4 is be connected to the sample holder via an extended shaft 6 that runs through the pole pieces 8, 10 making up the magnet. Rotor 12 carrying the sample is maintained at a fixed angle so that it can remain perpendicular to the magnetic field at all times. Rotor 12 is driven by an electric power drive from motor 4 that remains constant, with the speed being regulated through current feedback electronics (not shown). The speed at which rotor 12 is driven is variable and can be altered for different experiments. An inexpensive commercially available electric motor, such as Model MonstorTruck by Speedway, is a preferred motor, as it readily provides speeds up to 40,000 rpm and adequate torque for carrying small cuvettes.

It is possible to generate fields on the order of 0.8 Tesla or more by sandwiching the samples between pole pieces 8, 10 formed of rare earth dc magnets, for example, Neodymium-Boron (high strength) or ceramic (high strength and large size) or superconducting. Another alternative is to use an electromagnet (not shown) whose pole pieces sandwich the sample and, therefore, provide a more uniform field. It is possible to build an electromagnet with about 5,000 A-turns strength, driven by a power supply of adequate capacity. A hole is drilled through the pole pieces to allow the passage of the rotor shaft. The sample holder is spun in a gap of less than 2 cm using 0.5 cm cuvettes, so that uniform field of the order of 1 T can be produced with minimum fringing.

The sample holder, that is rotor 12, is preferably machined from a non-ferrous material to carry six to eight sample cuvettes 14, and the cuvette holder, rotor 12, is spun between magnet pole pieces 8, 10 so that the maximal orthogonal field is presented to the sample.

To achieve greater field strengths, electromagnets with convective cooling (air flow or circulating chilled water in coils) are used. By precision machining of pole pieces and the rotor and by reducing air flow turbulence, the separation of the pole pieces can be minimized to less than 1 cm so that there is little fringing of the magnetic field and a uniform field gradient is maintained throughout the cuvettes and their rotational range.

The rotary mechanism can be enhanced to have a mechanism to allow for a gradual stop of the rotor so that there is minimal mixing of the separated material. The instrument can be enhanced so that when the rotor speed is reduced, the applied magnetic field is proportionately reduced to strike a balance between the Lorentz and the centrifugal forces. A viewing window can be provided to view the motion of the charged particles during centrifugation. The viewing window can be strobed so that the cuvette appears motionless.

The magnets can be shaped to conform to the cuvette size and shape. Electromagnets can be pulsed only at the time that the cuvette passes between the pole pieces, thus maximizing the magnetic strength for short periods and minimizing the heating of the magnet due to passage of currents. Magnetic fields can be applied in a non-orthogonal direction for reduced Lorentz force effects but so as to make it convenient to have enhanced centrifugal forces or to facilitate a better rotor design. Instead of rotating the cuvette holding the particle, the magnet itself can be rotated (so that there is a relative motion between the magnet and the particle). Analogously, a linear or a vibratory motion can be imparted on the magnet while holding the particle steady. Also, both the magnet and the particles can be moved simultaneously and in synchronization to impart a relative motion. Instead of rotating the particles or the magnet, a rotating magnetic field can be created (as in electric motors) by using several magnetic pole pieces and alternating their fields in phase.

Figure 3:
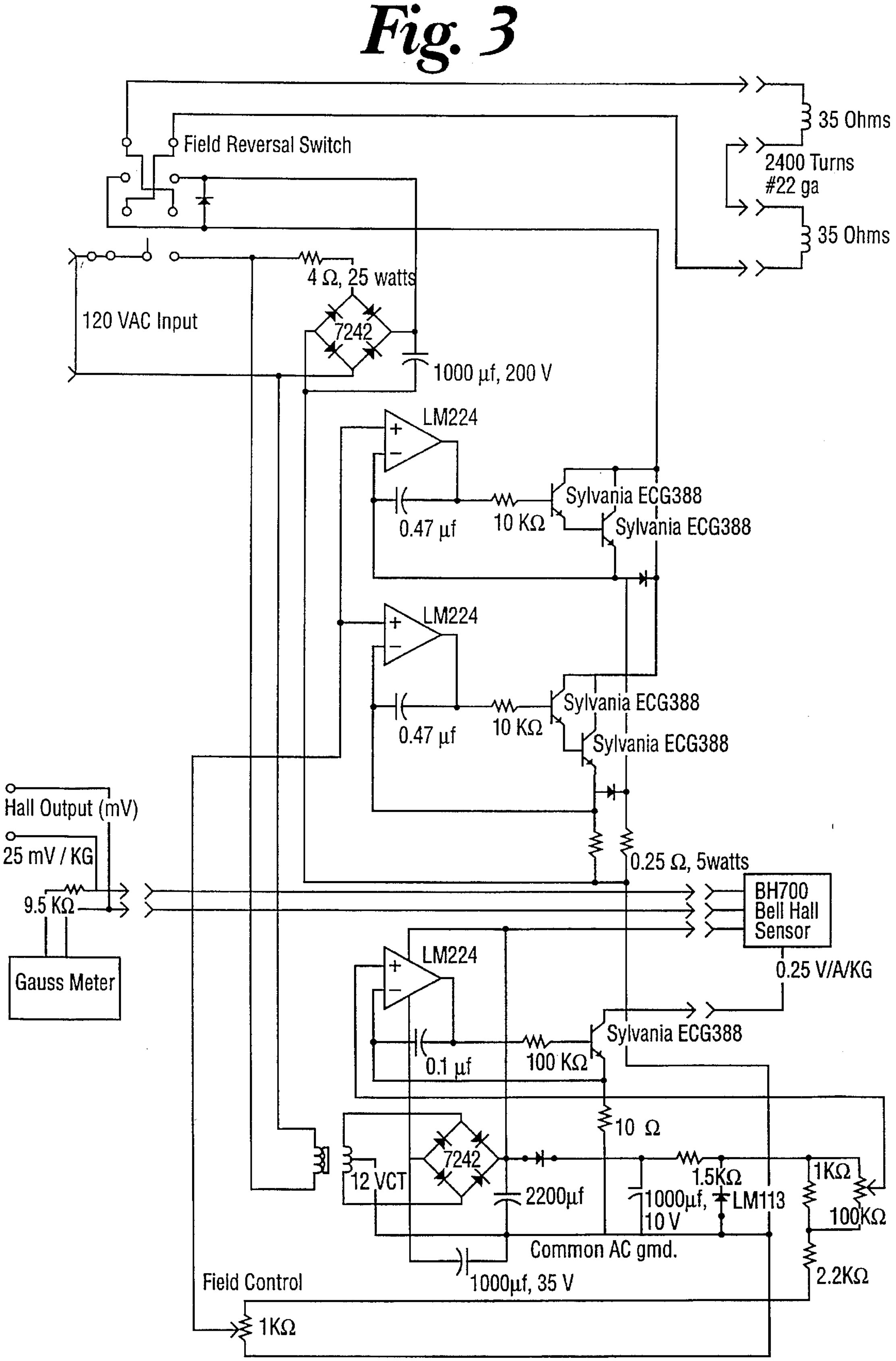
FIG. 3 depicts an exemplary circuit used to supply current to the coils of an electromagnet used to generate a magnetic field of about 0.8 T.

An exemplary circuit used to supply current to the coils of an electromagnet used to generate a magnetic field of about 0.8 Tesla is shown in FIG. 3. The power supply is compact but able to supply about 340 watts to the work coils. A full bridge rectifier and 1000 μf, 200 volt capacitor provide a source of crudely rectified 165 volt d.c. power.

The two coils are series connected so that their ampere-turns add constructively to flux in the gap. The cold resistance of each is about 35 ohms. The current at full voltage in the coils is about 2.2 amperes which produces a magnetic potential of over 10,000 ampere-turns. The power dissipation in the coils causes heating and subsequent increase in coil resistance. To maintain constant coil current with changing temperature an air cooling system is connected to the coils and the lower end of the coil winding is returned to the supply through the collectors of a pair of Darlington connected transistors. The two transistors are each individually driven by an operational amplifier that is configured to convert input voltage source to output current sink. The 0.25 ohm (passive element) resistors in the transistor emitter circuits develop a voltage to current transfer function of 1 amp. per 0.25 volt input. The combined function is therefore 2 amp per volt input. The LM113 is a precision voltage regulating diode. Its voltage to current transfer function of 1 amp per 0.25 volt input. The combined function is therefore 2 amp per volt input. The output of the LM113 is resistively divided by a network that includes the 10-turn field control potentiometer shown in the lower left corner of the schematic, FIG. 3. The potentiometer output therefore is a precision regulated voltage source that is adjustable from zero to about 0.3 volts.

Since the output transistors command (sink) current, the coil current is very constant even though the power source is regulated. At any given potentiometer setting the coil current (and flux) remain very constant in spite of supply ripple and coil heating. Ripple voltage on the supply shows up identically on the transistor collectors. The rate of the coil heat-up (resistance change) can be monitored by measuring the applied voltage across the coils versus time. The current regulation mode is valid as long as the transistors remain out of saturation.

Samples may be analyzed by digitizing the image taken with a CCD camera and by using IPLAB, a software designed for scientific image processing for the Macintosh II (version 1.1). The digitized image may then be analyzed with the use of IMAGE (version 1.4), image processing analysis software from the National Institutes of Health. The image of the test tube can be calibrated to 20 mm long and 5 mm wide and a scan of the length of the tube may be performed. Such a scan generates a numerical value for the light intensity through the length of the tube, therefore being able to determine the position of the band of particles in the density gradient. The values may then be statistically analyzed to determine the exact position and deviations of the bands and compared with normal centrifugation results.

EXPERIMENTAL RESULTS

Experiments were first carried out using microspheres as models of charged macromolecules. Microspheres were available in various types: polystyrene, latex, etc. with various charged sub-groups (carboxyl, amine, amide, hydroxyl, sulfonate), so that a microsphere with a desirable charge or mass was selected. Additionally, such microspheres also come in different colors or fluorescence, making the task of visualization easy (Fluorospheres from Molecular Probes, Eugene, OR). Some microspheres applicable to the experiments are listed below in Table I.

TABLE I

| Particle | Mean Diam. μm | Density g/ml | Surface charge $\mu C/cm^2$ | Area/group A/grp | Group |
|---|---|---|---|---|---|
| Bangs Lab | 0.15 | 1.05 | 22.04 | 72.6 | $SO_3$ |
| Bangs Lab | 0.327 | 1.060 | 4.1 | 7.3 | $CO_2H$ |
| Mol. Probes | 0.833 | 1.055 | 30.9 | 52 | $CO_2H$ |
| Mol. Probes | 1.09 | 1.055 | 5.59 | 287 | $CO_2H$ |

The first control experiments were carried out to determine the centrifuge speed and the B field necessary to achieve separation. The second set of experiments were carried out to verify the Lorentz effect: as a test, the applied B field polarity was reversed which resulted in the Lorentz force working in a direction opposite to that of the centrifugal force. The third set of experiments were carried out using particles with both positive (amidine: 0.019 μm, 0.03503 mEq/g) and negative charges ($SO_3$, $CO_2H$, e.g. Bangs Lab 0.15 μm, Molecular Probes 1.05 μm) which again showed directional sensitivities. The separation results (sedimentation velocity, separation time, etc.) will be compared with those obtained by conventional ultracentrifugation.

A second set of experiments were conducted using a charged protein (avidin) immobilized on microspheres. Lorentz forces were demonstrated by reversing the B field and other related experiments. Molecular weights, sequence, etc., of these molecules are well known. Further, DNA is easily visualized by mixing it with ethidium bromide and visualized under UV light and results compared with those obtained by electrophoresis. The conditions for separation of restriction fragments of low as well as high molecular weights (from kits available from Sigma) will be determined, and the separation of genomic fragments (New England Biolabs) will be considered. In these experiments, only known and purified commercially available standards are used. The separation results (mobility, time for separation and separable distance and overlap) will be compared with those obtained by conventional electrophoresis (pulsed or orthogonal field electrophoresis with genomic fragments).

Biological molecules can be chemically modified so that their charge or shape is altered to improve their separation by magentocentrifugation. The particles can be colored or fluorescent or bonded to fluorescent particles and molecules to enhance their detectability upon separation. DNA can be single-stranded, double-stranded, coiled, uncoiled, plasmid, genomic, etc. Each configuration of DNA will present different charge, mass and other physical properties and therefore can be separated by the different extents of Lorentz and other forces listed above acting on these particles. Ethedium bromide fluorescent tags or other chemicals can be used along with the DNA to facilitate its immediate detection inside the magnetocentrifuge under a UV light. The medium for particle separation can be neutral (e.g. sucrose) or charged (e.g. cesium chloride or percoil). The medium can also be made of a gel such as agarose used in electrophoresis. A neutral medium results in forces acting on the particles alone. An electrolytic medium would experience Lorentz forces too. The medium can be uniform or in a gradient. A density gradient medium will allow stabilization of the particles at the point of their neutral buoyancy. The electrolytic medium (electrophoresis gel) can be uniform or have a pH gradient. pH gradients change the charge of the particles and allow stabilization of the particles at the point of their neutral charge.

The centrifuge direction can be temporarily reversed so as to impart Lorentz force preferentially in one or the other direction. The centrifuge speed can be pulsed (on/off or high/low speeds for varying durations) to agitate or dither the particles, or to impart pulsed forces to impart accelerations (such action may be useful in reducing agglutination or for sequencing genomic DNA as with pulsed electrophoresis).

Of course, refinements of the basic device and method are possible, such as ultracentrifugation in the device, pulsed field application for greater Lorentz forces, simultaneous use of a detector to sense the presence and location of the sample, use of various media (density gradient and pH gradient, to improve separation based on density and charge, respectively). Thus, the magnetocentrifuge serves as a novel and powerful tool for molecular biology and biotechnology research and development.

While the invention has been described in connection with what is presently considered to be the most practical and preferred embodiment, it is to be understood that the invention is not to be limited to the disclosed embodiment, but rather is intended to cover various modifications and equivalent arrangements included within the spirit and scope of the appended claims.

What is claimed is:

1. A method of separating biological molecules based upon at least one property of mass and charge thereof, said molecules being dispersed in a medium having predetermined characteristics, comprising:

generating a centrifugal force;

applying said centrifugal force to the biological molecules and said medium;

generating a Lorentz force; and applying said Lorentz force to the biological molecules disperse in said medium during the step of applying the centrifugal force to the biological molecules disperse in said medium so as to separate said biological molecules based on at least one of mass and charge there of.

2. A method of separating biological molecules as claimed in claim 1, wherein said steps of generating said centrifugal force and applying said centrifugal force to said biological molecules comprise the step of:

imparting a rotational velocity to said biological molecules.

3. A method of separating biological molecules as claimed in claim 2, wherein said step of imparting a rotational velocity includes the steps of:

mounting at least one sample holder to a rotor assembly; and driving said rotor with a motor and spindle assembly.

4. A method of separating biological molecules as claimed in claim 2, wherein the steps of generating and applying the Lorentz force comprise the step of:

generating a magnetic field that is perpendicular to a rotational velocity vector of said rotor.

5. A method of separating biological molecules as claimed in claim 4, wherein the step of generating a magnetic field includes the step of:

positioning at least two magnetic pole pieces on opposite sides of a rotor on which said biological molecules are disposed.

6. A method of separating biological molecules as claimed in claim 5, wherein said positioning step includes positioning pole pieces made of ceramic.

7. A method of separating biological molecules as claimed in claim 5, wherein said positioning step includes positioning pole pieces being electromagnets.

8. A method of separating biological molecules as claimed in claim 5, wherein the step of positioning said pole pieces includes the step of:

supplying said pole pieces made from rare earth dc magnets.

9. A method of separating biological molecules as claimed in claim 8, wherein said supplying step includes supplying pole pieces made of Neodymium-Boron.

10. A method of separating biological molecules as claimed in claim 8, wherein said positioning step includes positioning pole pieces made of superconducting magnets.

* * * * *